US010980689B2

(12) United States Patent
Bhimavarapu et al.

(10) Patent No.: US 10,980,689 B2
(45) Date of Patent: Apr. 20, 2021

(54) PATIENT SUPPORT APPARATUSES WITH PERSONAL ELECTRONIC DEVICE CHARGING

(71) Applicant: Stryker Corporation, Kalamazoo, MI (US)

(72) Inventors: Krishna Sandeep Bhimavarapu, Kalamazoo, MI (US); Kurosh Nahavandi, Portage, MI (US); Anish Paul, Portage, MI (US); Cory Patrick Herbst, Shelbyville, MI (US); Jonathan Mark Greenbank, Plainwell, MI (US); Christopher Matthew Reget, Grayslake, MI (US)

(73) Assignee: Stryker Corporation, Kalamazoo, MI (US)

( * ) Notice: Subject to any disclaimer, the term of this patent is extended or adjusted under 35 U.S.C. 154(b) by 356 days.

(21) Appl. No.: 16/035,156

(22) Filed: Jul. 13, 2018

(65) Prior Publication Data
US 2019/0015276 A1    Jan. 17, 2019

Related U.S. Application Data

(60) Provisional application No. 62/532,716, filed on Jul. 14, 2017.

(51) Int. Cl.
*A61G 7/05* (2006.01)
*H02J 7/00* (2006.01)
(Continued)

(52) U.S. Cl.
CPC .......... *A61G 7/0524* (2016.11); *A61G 7/0527* (2016.11); *H02J 7/0042* (2013.01);
(Continued)

(58) Field of Classification Search
CPC ............... A61G 7/0524; A61G 7/0527; A61G 2203/44; A61G 2203/32; H02J 7/0042;
(Continued)

(56) References Cited

U.S. PATENT DOCUMENTS

| 5,106,159 A | 4/1992 | Iwamoto |
| 5,398,149 A | 3/1995 | Weil |

(Continued)

OTHER PUBLICATIONS

Stryker Operations Manual InTouch Critical Care Bed Model FL27, Apr. 2012.
(Continued)

*Primary Examiner* — Eric J Kurilla
*Assistant Examiner* — James T Coble
(74) *Attorney, Agent, or Firm* — Warner Norcross + Judd LLP

(57) ABSTRACT

A patient support apparatus includes a frame, a patient support surface, one or more force sensors that detect weight on the patient support surface, a recharger, and a controller. The recharger is adapted to recharge a personal electronic device of the patient's. The controller controls power supplied to the recharger based on outputs from the force sensors. Additionally or alternatively, a barrier is provided having a coil therein. The recharger includes a magnet for magnetically coupling to the barrier, and the recharger wirelessly receives power from the coil when the recharger is magnetically coupled to the barrier. Alternatively, the magnet holds a personal electronic device that receives power wirelessly from a coil inside the barrier. In still another variation, a pendant is included for controlling movement of the patient support apparatus and the pendant includes a recharger adapted to recharge a personal electronic device.

20 Claims, 8 Drawing Sheets

(51) Int. Cl.
*H02J 7/02* (2016.01)
*H02J 50/10* (2016.01)

(52) U.S. Cl.
CPC ...... *A61G 2203/32* (2013.01); *A61G 2203/44* (2013.01); *H02J 7/00* (2013.01); *H02J 7/0044* (2013.01); *H02J 7/025* (2013.01); *H02J 50/10* (2016.02)

(58) Field of Classification Search
CPC .. H02J 7/00; H02J 7/0044; H02J 7/025; H02J 7/02; H02J 50/10
USPC ....................................................... 320/108
See application file for complete search history.

(56) References Cited

U.S. PATENT DOCUMENTS

| | | | |
|---|---|---|---|
| 5,536,979 A * | 7/1996 | McEachern | H02J 7/025 307/104 |
| 5,966,760 A | 10/1999 | Gallant | |
| 6,923,684 B2 | 8/2005 | Strayer | |
| 7,074,091 B2 | 7/2006 | Strayer | |
| 7,321,811 B1 | 1/2008 | Rawls-Meehan | |
| 7,389,552 B1 | 6/2008 | Reed et al. | |
| D573,952 S | 7/2008 | Schwartz | |
| 7,690,059 B2 | 4/2010 | Lemire et al. | |
| 7,805,784 B2 | 10/2010 | Lemire et al. | |
| 7,861,334 B2 | 1/2011 | Lemire et al. | |
| 7,874,410 B2 | 1/2011 | Fullbrook et al. | |
| 7,884,735 B2 | 2/2011 | Newkirk | |
| 7,933,669 B2 | 4/2011 | Rawls-Meehan | |
| 7,962,981 B2 | 6/2011 | Lemire et al. | |
| 8,006,332 B2 | 8/2011 | Lemire et al. | |
| 8,082,160 B2 | 12/2011 | Collins, Jr. et al. | |
| 8,084,992 B2 | 12/2011 | Sheffy et al. | |
| 8,132,856 B2 | 3/2012 | Wilson et al. | |
| 8,143,846 B2 | 3/2012 | Herman et al. | |
| 8,145,800 B2 | 3/2012 | Levin | |
| 8,188,713 B2 | 5/2012 | Lee | |
| 8,214,566 B2 | 7/2012 | Edwards et al. | |
| 8,258,973 B2 | 9/2012 | Newkirk | |
| 8,347,433 B1 | 1/2013 | Shih | |
| 8,393,026 B2 | 3/2013 | Dionne et al. | |
| 8,454,087 B2 | 6/2013 | Canterbury | |
| 8,499,108 B2 | 7/2013 | Edwards et al. | |
| 8,499,384 B2 | 8/2013 | Zerhusen | |
| 8,572,778 B2 | 11/2013 | Newkirk et al. | |
| 8,618,918 B2 | 12/2013 | Tallent et al. | |
| 8,701,229 B2 | 4/2014 | Lemire et al. | |
| 8,740,301 B2 | 6/2014 | Liu | |
| 8,840,176 B2 | 9/2014 | Mouradian | |
| 8,862,241 B2 | 10/2014 | Forsell | |
| 8,864,205 B2 | 10/2014 | Lemire et al. | |
| 8,931,947 B2 | 1/2015 | Chien | |
| 8,935,985 B2 | 1/2015 | Hjelm | |
| 8,953,308 B2 | 2/2015 | Riley et al. | |
| 8,973,882 B2 | 3/2015 | Stangl et al. | |
| 9,375,374 B2 * | 6/2016 | Herman | A61G 7/0524 |
| 9,685,814 B1 * | 6/2017 | Moyer | H02J 7/00034 |
| 10,517,784 B2 * | 12/2019 | Zerhusen | A61G 7/0524 |
| 2005/0079769 A1 | 4/2005 | Strayer | |
| 2006/0056616 A1 * | 3/2006 | Heimbrock | H04M 1/04 379/428.01 |
| 2006/0058587 A1 * | 3/2006 | Heimbrock | A61G 7/018 600/300 |
| 2006/0179565 A1 | 8/2006 | Miller | |
| 2008/0172789 A1 * | 7/2008 | Elliot | A61G 7/0528 5/616 |
| 2009/0015027 A1 | 1/2009 | Lambarth et al. | |
| 2009/0266274 A1 | 10/2009 | Berlin et al. | |
| 2011/0109211 A1 | 5/2011 | Kirkeby et al. | |
| 2011/0138534 A1 | 6/2011 | Kozel | |
| 2011/0215755 A1 | 9/2011 | Hwang et al. | |
| 2011/0247135 A1 | 10/2011 | Herman et al. | |
| 2011/0247137 A1 | 10/2011 | Herman et al. | |
| 2012/0200129 A1 | 8/2012 | Wilson, Jr. | |
| 2012/0312196 A1 * | 12/2012 | Newkirk | A47B 23/046 108/23 |
| 2013/0249256 A1 | 9/2013 | Payne, Jr. et al. | |
| 2013/0264851 A1 | 10/2013 | Kim et al. | |
| 2014/0168985 A1 | 6/2014 | Chien | |
| 2014/0194257 A1 | 7/2014 | Ceysens et al. | |
| 2014/0197666 A1 | 7/2014 | Koch | |
| 2014/0218927 A1 | 8/2014 | Chien | |
| 2014/0312691 A1 | 10/2014 | Doljack et al. | |
| 2014/0358193 A1 | 12/2014 | Lyons et al. | |
| 2015/0130412 A1 * | 5/2015 | Partovi | H02J 50/12 320/108 |
| 2015/0196443 A1 * | 7/2015 | Tarquinio | A47C 21/00 5/613 |
| 2015/0270058 A1 * | 9/2015 | Golko | H01F 27/36 307/104 |
| 2017/0155259 A1 * | 6/2017 | Mecca | A47B 21/06 |
| 2017/0288448 A1 * | 10/2017 | Kranz | H02J 50/12 |

OTHER PUBLICATIONS

Hill-Rom Centrella Smart Bed Manual, September.
Micrel 2033 High Accuracy, High-Side, Fixed Current Limited Power Switch Manual, Nov. 11, 2015.

* cited by examiner

PATIENT SUPPORT APPARATUSES WITH PERSONAL ELECTRONIC DEVICE CHARGING

CROSS-REFERENCE TO RELATED APPLICATIONS

This application claims priority to U.S. provisional patent application Ser. No. 62/532,716 filed Jul. 14, 2017, by inventors Krishna Bhimavarapu et al. and entitled PATIENT SUPPORT APPARATUSES WITH PERSONAL ELECTRONIC DEVICE CHARGING, the complete disclosure of which is incorporated herein by reference.

BACKGROUND

The present disclosure relates to patient support apparatuses—such as beds, stretchers, cots, recliners, and the like—and more particularly to patient support apparatuses that include power supplies for powering and/or recharging a patient's electronic devices, such as, but not limited to, a cell phone, tablet, MP3 player, etc.

Many patient support apparatuses don't include any outlets or ports for charging or recharging a patient's personal electronic device. For those that do, the power recharging port may be positioned at an inconvenient location, may not be easily sanitized, may subject a cable to a shearing risk when a siderail is raised or lowered, and/or may suffer from one or more other disadvantages.

SUMMARY

According to various aspects of the present disclosure, patient support apparatuses are provided that include one or more rechargers for allowing a patient's personal electronic device to be powered or recharged while the patient is positioned on the patient support apparatus. The rechargers may include a port into which a cable is inserted that couples at its other end to the personal electronic device, or they may include a coil for wirelessly transferring electrical power. The wireless power transfer may be directly from the patient support apparatus to the personal electronic device, or it may be first transferred to an intermediate device that then transfers the power to the personal electronic device. In some embodiments, a smooth, easily cleanable surface is provided on the patient support apparatus through which electrical power is wirelessly transferred, thereby avoiding the creation of hard-to-reach nooks and crannies that are not easily sanitized. Still other features may be present, as discussed in greater detail below.

A patient support apparatus according to a first embodiment of the present disclosure includes a frame, a patient support surface, a plurality of force sensors, a recharger, and a controller. The force sensors detect weight applied to the patient support surface. The recharger allows a patient to recharge a personal electronic device. The controller communicates with the force sensors and the recharger and controls power supplied to the recharger based on outputs from the force sensors.

According to other aspects of the present disclosure, the recharger includes a recharging port adapted to receive a plug from a cable that is coupleable to the personal electronic device. Alternatively, or additionally, the recharger includes a recharging coil adapted to wirelessly recharge the personal electronic device when the personal electronic device is positioned adjacent the recharging coil.

In some embodiments, the controller terminates power to the recharger after the patient exits from the patient support surface. The power termination may be delayed for a predetermined time period after the patient exits from the patient support surface. The controller also resumes supplying power to the recharger when the patient returns to the patient support surface.

The force sensors may be load cells.

The recharger, in some embodiments, is magnetically coupled to a component of the patient support apparatus. The recharger wirelessly receives power from a coil attached to the component, and the recharger transfers the power it wirelessly receives from the coil to the personal electronic device, either via a wire or wirelessly.

In some embodiments, the recharger is integrated into a pendant having a user interface. The pendant includes controls for controlling a plurality of functions of the patient support apparatus.

A patient support apparatus according to another embodiment of the present disclosure includes a frame, a patient support surface, a barrier, and a recharger. The barrier is positioned adjacent the patient support surface and includes a coil therein. The recharger includes a magnet for magnetically coupling to the barrier. The recharger wirelessly receives power from the coil when the recharger is magnetically coupled to the barrier, and the recharger uses the wirelessly received power to supply power to a personal electronic device of the patient's.

In other aspects of the present disclosure, the patient support apparatus further includes a sensor coupled to the barrier that detects the presence of the recharger. A control uses outputs from the sensor to supply power to the coil when the recharger is magnetically coupled to the barrier and to terminate power to the coil when the recharger is not magnetically coupled to the barrier. The recharger may include a port for receiving a cable that couples to the personal electronic device. The port supplies power to the cable when the cable is plugged into the port.

A second coil is positioned inside the recharger in some embodiments. The second coil wirelessly supplies electrical power to the personal electronic device when the personal electronic device is positioned adjacent the recharger. The recharger may further comprise a holder for the personal electronic device that holds the personal electronic device sufficiently close to the second coil such that power from the second coil is wirelessly transferred to the personal electronic device from the recharger.

In some embodiments, the patient support apparatus further comprises a sensor and a plurality of force sensors. The sensor is coupled to the barrier and detects the presence of the recharger. The force sensors detect weight applied to the patient support surface. The controller does the following: (1) terminates power to the coil when the recharger is not magnetically coupled to the barrier, regardless of outputs from the force sensors; and (2) terminates power to the coil when a patient exits the patient support surface and the recharger is magnetically coupled to the barrier. In some embodiments, the controller is further adapted to supply power to the coil when the sensor detects the presence of the recharger and the force sensors indicate a patient is on the patient support surface.

According to some aspects, an electromagnet is integrated into the barrier and magnetically couples the recharger to the barrier when the electromagnet is powered.

According to still another embodiment of the present disclosure, a patient support apparatus is provided that includes a frame, a patient support surface, a control system, a first user interface, and a pendant. The control system is adapted to change an orientation of a first portion of a patient support surface. The first user interface includes a control for activating the control system to change the orientation of the first portion of the patient support surface. The pendant is removably coupled to the control system and includes a second user interface. The second user interface has a second control for changing the orientation of the first portion of the patient support surface, as well as a recharger adapted to recharge a personal electronic device.

According to other aspects of the present disclosure, the pendant further includes a coil and a holder for the personal electronic device. The holder supports the personal electronic device sufficiently close to the coil such that power from the coil is wirelessly transferred to the personal electronic device while the personal electronic device is supported in the holder. The holder may include a magnet adapted to magnetically retain the holder to a portion of the patient support apparatus adjacent the coil.

According to still another embodiment of the present disclosure, a patient support apparatus is provided that includes a frame, a patient support surface, a barrier, a coil, a magnet and a controller. The coil and magnet are incorporated into the barrier adjacent a surface of the barrier. The controller supplies power to the coil such that a personal electronic device magnetically supported by the magnet is able to be wirelessly recharged via power delivered from the coil to the personal electronic device.

In some embodiments, the magnet is an electromagnet and the controller controls power supplied to the electromagnet.

According to other aspects of the present disclosure, the barrier is a siderail, the surface is substantially vertical, and the magnet is adapted to hold the personal electronic device against the surface.

A switch is included in some embodiments that communicates with the controller. The controller supplies power to the coil when the switch is in an on state and terminates power to the coil when the switch is in an off state. In some of these embodiments, the magnet is an electromagnet and the controller supplies power to the electromagnet when the switch is in the on state and terminates power to the electromagnet when the switch is in the off state.

Before the various embodiments disclosed herein are explained in detail, it is to be understood that the claims are not to be limited to the details of operation or to the details of construction, nor to the arrangement of the components set forth in the following description or illustrated in the drawings. The embodiments described herein are capable of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the claims to any specific order or number of components. Nor should the use of enumeration be construed as excluding from the scope of the claims any additional steps or components that might be combined with or into the enumerated steps or components.

DETAILED DESCRIPTION OF THE EMBODIMENTS

Figure 1:
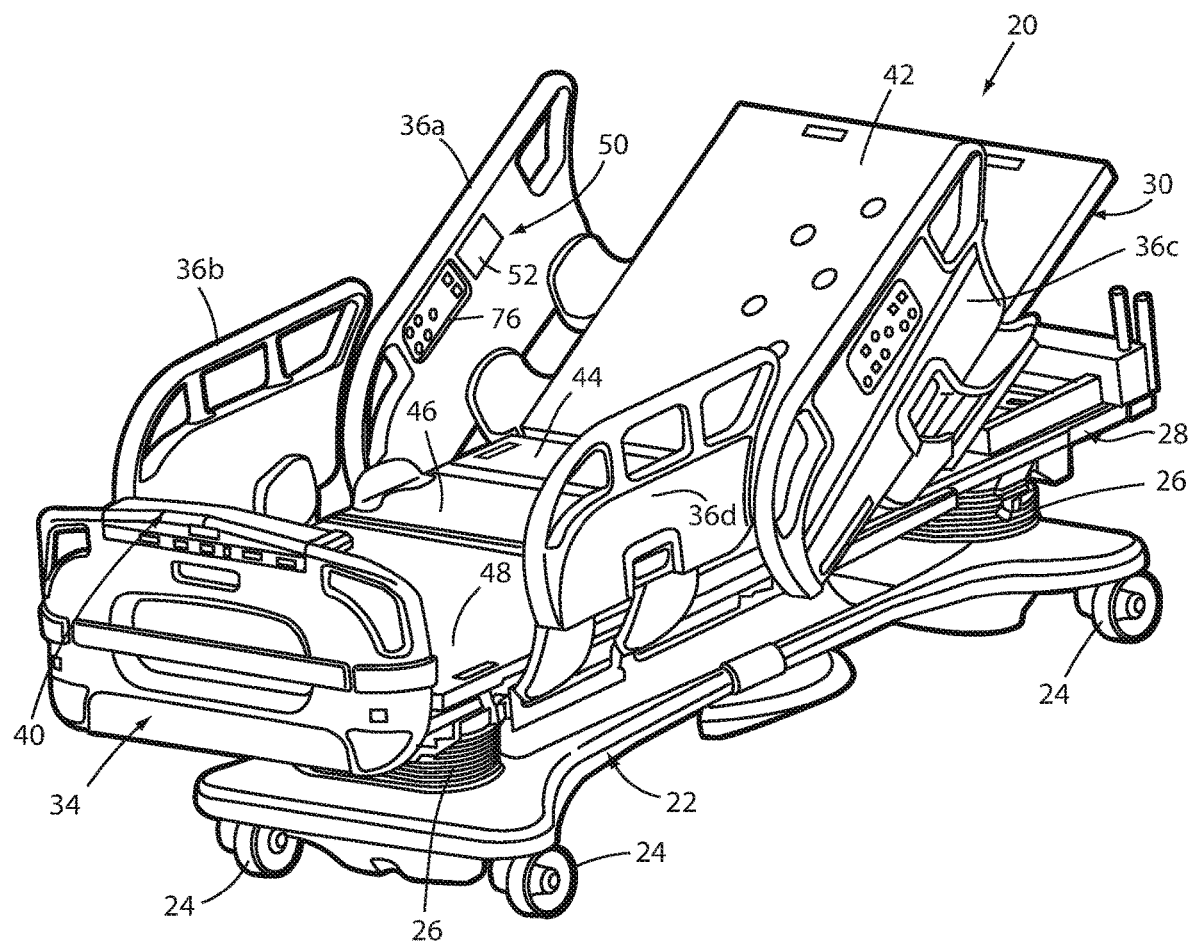
FIG. 1 is a perspective view of an illustrative patient support apparatus according to one aspect of the present disclosure.

An illustrative patient support apparatus 20 according to a first embodiment of the present disclosure is shown in FIG. 1. Although the particular form of patient support apparatus 20 illustrated in FIG. 1 is a bed adapted for use in a hospital or other medical setting, it will be understood that patient support apparatus 20 could, in different embodiments, be a cot, a stretcher, a gurney, a recliner, or another type of structure capable of supporting a patient, whether stationary or mobile.

Patient support apparatus 20 of FIG. 1 includes a base 22 having a plurality of wheels 24, a pair of lifts 26, a frame or litter assembly 28, a patient support surface or deck 30, and a footboard 34. Wheels 24 can be selectively locked and unlocked so that, when unlocked, patient support apparatus 20 is able to be wheeled to different locations. Lifts 26 are adapted to raise and lower frame 28 with respect to base 22. Lifts 26 may be hydraulic actuators, electric actuators, or any other suitable device for raising and lowering frame 28 with respect to base 22. In some embodiments, lifts 26 operate independently so that the orientation of frame 28 with respect to base 22 may also be adjusted.

Frame 28 provides a structure for supporting deck 30 and other components (e.g. footboard 34 and a headboard (not shown)). Deck 30 provides a surface on which a mattress (now shown), or other soft cushion, is positionable so that a patient may lie and/or sit thereon. Deck 30 is made of a plurality of sections, some of which are pivotable about generally horizontal pivot axes. In the embodiment shown in FIG. 1, deck 30 includes a head section 42, a seat section 44, a thigh section 46, and a foot section 48. Head section 42, which is also sometimes referred to as a Fowler section, is pivotable between a generally horizontal orientation (not shown in FIG. 1) and a plurality of raised positions (one of which is shown in FIG. 1).

In addition to the aforementioned components, patient support apparatus 20 includes four barriers that are implemented as side rails. These four siderails comprise a right head end side rail 36*a*, a right foot end side rail 36*b*, a left head end side rail 36*c* and a left foot end side rail 36*d*. Siderails 36 are movable between a raised position and a lowered position. In the configuration shown in FIG. 1, all four of the siderails 36 are in the raised position and form barriers that generally prevent a patient on support deck 30 from exiting patient support apparatus 20. In some embodiments, patient support apparatus 20 includes a different number of siderails 36, such as, but not limited to, two siderails.

Patient support apparatus 20 further includes a user interface 40 that enables a user of patient support apparatus 20—such as a caregiver associated with the patient who occupies patient support apparatus 20—to control one or more aspects of patient support apparatus 20. Such aspects include, but are not limited to, changing a height of support deck 30, raising or lowering head section 42, activating and deactivating a brake for wheels 24, arming and disarming an exit detection system 82 (FIG. 4) and, as will be explained in greater detail below, controlling one or more aspects of a recharging system.

User interface 40 is implemented in the embodiment shown in FIG. 1 as a control panel having a lid (flipped down in FIG. 1) underneath which is positioned a plurality of controls. The controls may be implemented as buttons, dials, switches, or other devices. User interface 40 may also include a display, which may be a touchscreen, for displaying information regarding patient support apparatus 20. Although FIG. 1 illustrates user interface 40 mounted to footboard 34, it will be understood that user interface 40 can be positioned elsewhere.

Any aspects of the physical construction of any of base 22, lifts 26, frame 28, deck 30, footboard 34, and siderails 36 that are not explicitly described herein may be constructed in the same manner as disclosed in commonly assigned, U.S. Pat. No. 7,690,059 issued to Lemire et al., and entitled HOSPITAL BED, the complete disclosure of which is incorporated herein by reference; or as disclosed in commonly assigned U.S. Pat. publication No. 2007/0163045 filed by Becker et al. and entitled PATIENT HANDLING DEVICE INCLUDING LOCAL STATUS INDICATION, ONE-TOUCH FOWLER ANGLE ADJUSTMENT, AND POWER-ON ALARM CONFIGURATION, the complete disclosure of which is also hereby incorporated herein by reference; or as embodied in the commercially available S3 bed sold by Stryker Corporation of Kalamazoo, Mich., and documented in the Stryker Maintenance Manual for Stryker's MedSurg Bed, Model 3002 S3, (doc. 3006-109-002 Rev D), published in 2010, the complete disclosure of which is also hereby incorporated herein by reference. The construction of any aspects of base 22, lifts 26, frame 28, deck 30, footboard 34 and/or siderails 36 that are not explicitly described herein may also take on other forms different from what is disclosed in these documents.

Patient support apparatus 20 also includes one or more recharging systems 50 that are adapted to allow a patient, or other individual in the same room as patient support apparatus 20, to recharge his or her personal electronic device (e.g. a cell phone, a tablet, a laptop, etc.). One embodiment of a recharging system 50 is shown in more detail in FIGS. 1-4 and includes a mounting surface 52, a primary module 54, and a recharging unit 56. Recharging system 50 also includes one or more coils 62, one or more magnets or electromagnets 70, a sensor 72, a control panel 76, and a switch 78.

Figure 4:
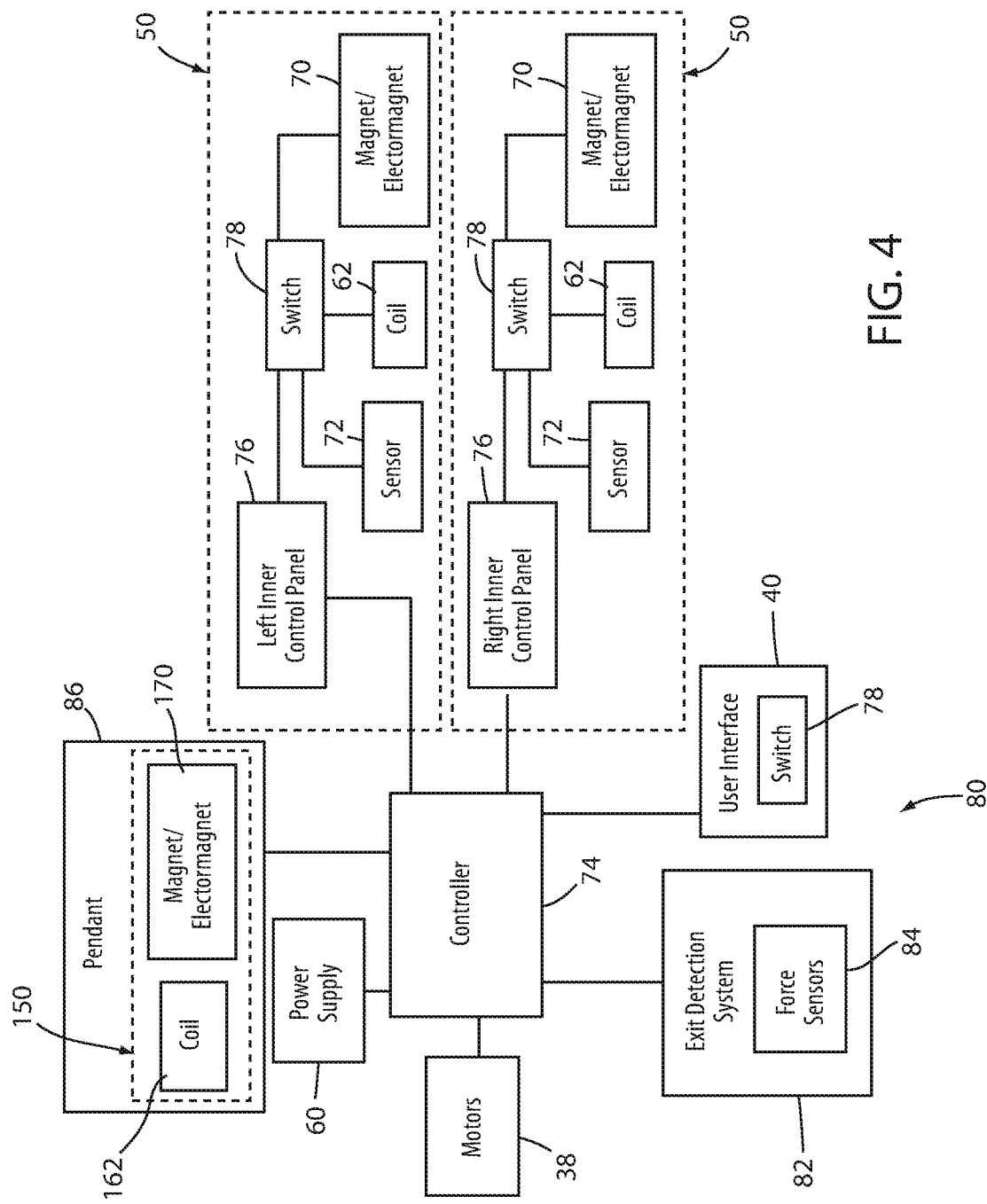
FIG. 4 is a diagram of a control system usable with any of the patient support apparatuses disclosed herein, the control system including multiple recharging systems.

As is shown in FIG. 4, recharging system 50 is part of, and/or in communication with, a control system 80 for the entire patient support apparatus 20. Control system 80 includes controller 74 (which may also control, and be part of, recharging system 50), a user interface 40, one or more motors 38, and a power supply 60. Motors 38 are adapted to move various components of patient support apparatus 20, such as lifts 26 and/or the pivoting of head section 42 about a generally horizontal pivot axis, and/or other components. Controller 74 includes one or more conventional microcontrollers, microprocessors, and/or other programmable electronics that are programmed to carry out the functions described herein. It will be understood that controller 74 may also include other electronic components that are programmed to carry out the functions described herein, or that support the microcontrollers, microprocessors, and/or other electronics. The other electronic components include, but are not limited to, one or more field programmable gate arrays, systems on a chip, volatile or nonvolatile memory, discrete circuitry, integrated circuits, application specific integrated circuits (ASICs) and/or other hardware, software, or firmware, as would be known to one of ordinary skill in the art. Such components can be physically configured in any suitable manner, such as by mounting them to one or more circuit boards, or arranging them in other manners, whether combined into a single unit or distributed across multiple units. Such components may be physically distributed in different positions on patient support apparatus 20, or they may reside in a common location on patient support apparatus 20. When physically distributed, the components may communicate using any suitable serial or parallel communication protocol, such as, but not limited to, CAN, LIN, Firewire, I-squared-C, RS-232, RS-485, etc.

In the embodiment shown in FIG. 4, there are two recharging systems 50 built into patient support apparatus 20, one for the right head end siderail 36*a* and one for the left head end siderail 36*c*. It will be understood that patient support apparatus 20 can be modified to include a greater number of recharging systems 50, or only a single recharging system 50. Further, the recharging system 50 may be positioned at locations other than head end siderails 36*a,c*, such as, but not limited to, siderails 36*b,d*, footboard 34, a headboard (not shown), a pendant, or still other locations.

Primary module 54 of recharging system 50 is positioned inside one or more of the siderails 36 and adjacent mounting surface 52. Recharging unit 56 is positioned outside of the siderails 36 and is adapted to be releasably attached to the siderails 36 at the location of mounting surface 52. Primary module 54 is electrically coupled to a source of electricity by a cable 58, or other structure, that is internal to patient support apparatus 20. That is, cable 58 runs internally within patient support apparatus 20 to a power supply 60 (FIG. 4) of patient support apparatus 20. Power supply 60 is electrically coupled to a patient support apparatus battery and/or to a cable having a plug on its distal end adapted to be plugged into an electrical wall outlet so that patient support apparatus 20 can receive electrical power from the mains power.

Primary module 54 includes one or more internal coils 62 (FIG. 4). Coils 62 are adapted to be powered by electrical power from cable 58 and to inductively transfer electrical energy from primary module 54 to recharging unit 56 when recharging unit 56 is positioned in contact with, or closely adjacent to, mounting surface 52. Recharging unit 56 includes its own coil(s) that inductively receive the electrical power wirelessly transferred from primary module 54. Recharging unit 56 further includes one or more ports 64 that are adapted to be electrically coupled to one or more personal electronic devices, such as the personal electronic device 66 shown in FIG. 3.

Figure 3:
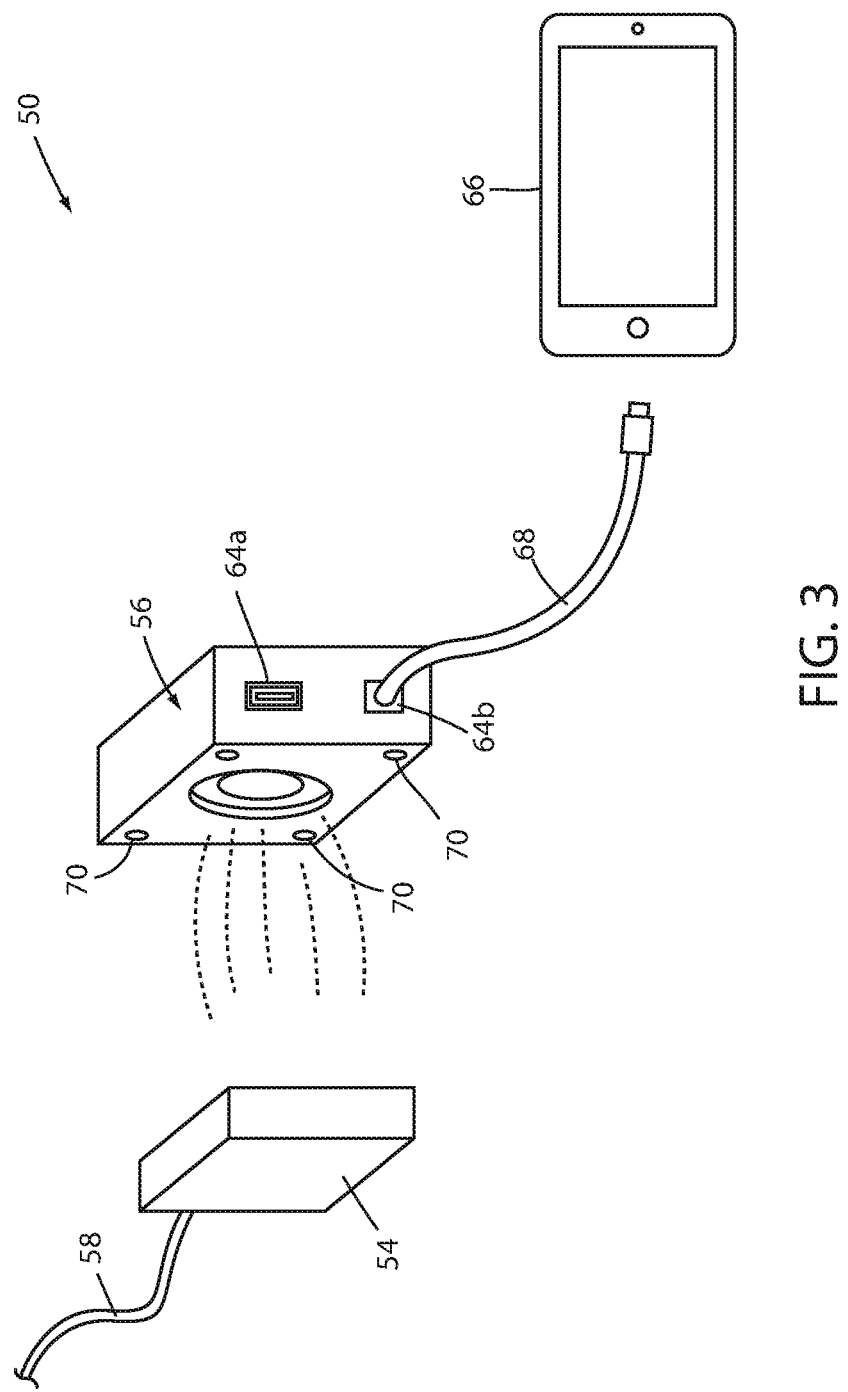
FIG. 3 is a perspective view of several components of the recharging system of FIG. 2.

Ports 64 may take on a variety of different forms. In the embodiment illustrated in FIG. 3, a first port 64a is a conventional Universal Serial Bus (USB) port adapted to couple to a USB cable that is connectable at its other end to personal electronic device 66. FIG. 3 also illustrates a second port 64b that is coupled to a cable 68. Cable 68 is plugged into personal electronic device 66 at its other end. Personal electronic device 66 therefore receives electrical power from recharging unit 56 via cable 68. Ports 64a and 64b may both be USB ports, or one or both of them may be a different type of port. In some embodiments, at least one of ports 64a and 64b is a Type A USB receptacle. Such receptacles allow a cable having a Type A USB plug on one end to be plugged into the Type A USB receptacle. The other end of the cable plugs into a port on the personal electronic device 66. Because USB cables having a Type A plug on one end and a variety of different USB plug types on the other end are common (e.g. USB mini-A, USB mini-B, USB micro B, USB type-C, non-USB, etc.), it is generally easy to find a cable that is compatible with both an individual's particular personal electronic device and the Type A receptacle on recharging unit 56. Nevertheless, recharging unit 56 may be varied to include other types of ports besides a Type A USB receptacle.

In some embodiments, recharging unit 56 includes one or more built-in cables that have multiple types of plugs on its end. Such multiple plug types include types that are compatible with commonly used personal electronic devices. Thus, the one or more built-in cables may include a free end having a plurality of USB type plugs. In other embodiments, however, one or more non-USB plugs may be included on the free end of the built-in cable.

Recharging unit 56 is adapted to releasably stick to mounting surface 52. In some embodiments, this releasability is accomplished by the use of one or more magnets and/or electromagnetics 70 (FIG. 4). A first set of one or more magnets/electromagnets 70 are built into siderail 36 adjacent mounting surface 52 and a second set of one or more magnets/electromagnets 70 are incorporated into recharging unit 56. The magnets/electromagnets 70 are located such that when recharging unit 56 is positioned in the vicinity of mounting surface 52, the magnetic attraction between the sets of magnets/electromagnets 70 will retain recharging unit 56 against mounting surface 52. The positioning of the magnets/electromagnets 70 is further designed to help ensure that, when recharging unit 56 is magnetically coupled to mounting surface 52, it is held at a position in which the coil(s) of siderail 36 are aligned with the coil(s) of recharging unit 56, thereby ensuring that the wireless transfer of electrical power to recharging unit 56 takes place efficiently.

As shown in FIG. 4, recharging system 50 further includes a sensor 72 and at least one switch 78. Sensor 72 is adapted to detect the presence of recharging unit 56 when recharging unit 56 is positioned adjacent mounting surface 52. Sensor 72 is in communication with switch 78 and sends a signal to switch 78 when sensor 72 detects recharging unit 56. In response to this signal, switch 78 turns on electrical power to coil 62. Further, in some embodiments discussed in more detail below, switch 78 may also turn on power to one or more electromagnets 70 (if included in siderail 36). When electrical power is supplied to the one or more coils 62, the coils are able to inductively transfer electrical power from siderail 36 to recharging unit 56. When a person removes recharging unit 56 from a position adjacent mounting surface 52, sensor 72 detects this removal and sends a different signal (or terminates the previously sent signal) to switch 78, causing switch 78 to terminate electrical power to coil 62. In this manner, coil 62 is only powered when a recharging unit 56 is positioned adjacent to it.

In the embodiment of recharging system 50 shown in FIG. 4, the control panel 76 adjacent to each mounting surface 52 is also in communication with switch 78. In this embodiment, control panel 76 includes one or more controls for allowing a user to manually turn on and off switch 78. Thus, instead of automatically turning on and off the switch 78 in response to the outputs from sensor 72, a user can manually turn on and off electrical power to coil 62 using the appropriate control on control panel 76.

The control on control panel 76 that turns on and off electrical power to coil 62 may also control the electrical power supplied to one or more electromagnets 70, as noted. Alternatively, control panel 76 may include two separate controls for recharging system 50: one for turning on/off power to coil 62 and one for turning on/off power to one or more electromagnets. In this embodiment, an additional switch may be included that is separate from switch 78. The additional switch is used to control the power supplied to one of coil 62 and electromagnet 70, while switch 78 is used to control the power supplied to the other of coil 62 and electromagnet 70. Switch 78 and/or the additional switch may also or alternatively be positioned on user interface 40 of patient support apparatus 20.

As yet another alternative, siderail 36 of recharging system 50 may include permanent magnet(s) instead of electromagnets, in which case the control on control panel 76 only turns on and off power to coil 62. In this alternative embodiment, as well as other alternative embodiments, sensor 72 may be omitted and power to coil 62 may be controlled by manual usage of the control on control panel 76. As yet another alternative embodiment, electrical power may be continually supplied to coil 62 and any electromagnets 70 so that switch 78 and sensor 72 may both be modified. This continual supply of electrical power may continue at all times, or it may be interrupted under the control of one or more elements of control system 80, as will be discussed in greater detail below.

In at least one embodiment of the recharging system 50 shown in FIG. 4, recharging unit 56 includes one or more permanent magnets 70, and siderail 36 includes one or more electromagnets 70 (as well as sensor 72 and switch 78). Switch 78 is a sensor, such as, but not limited to, a Hall Effect sensor, and detects when recharging unit 56 is positioned within close proximity to mounting surface 52. When so detected, the sensor 72 sends a signal to switch 78 to turn on electrical power to the one or more electromagnets 70 and coil(s) 62 of siderail 36. The supply of power to the electromagnets 70 magnetically attracts the permanent magnet(s) of recharging unit 56 and holds recharging unit 56 against mounting surface 52. Electrical power continues to be supplied to the electromagnets 70 and coils 62 until sensor 72 no longer detects the presence of recharging unit 56. In this manner, electrical power is automatically supplied to the one or more electromagnets 70 and coil 62 when recharging unit 56 is positioned adjacent thereto, and is automatically terminated when recharging unit 56 is pulled away from mounting surface 52.

In another modified embodiment, the position of the sensor, switch, electromagnet(s), and magnet(s) are reversed from the aforementioned embodiment. That is, in at least one modified embodiment, recharging unit 56 includes one or more electromagnets 70, a switch (like switch 78), and a sensor (like sensor 72), and siderail 36 includes one or more permanent magnets 70. In this modified embodiment, recharging unit 56 applies power to its one or more electromagnets 70 when its sensor detects the presence of siderail 36 (or a component of siderail 36, such as the permanent magnet(s) positioned inside of siderail 36). Power continues to be supplied to the electromagnets 70 until recharging unit 56 is pulled away from mounting surface 52, at which point the switch inside of recharging unit 56 terminates power to the one or more electromagnets 70.

In another modified embodiment of recharging system 50, both siderail 36 and recharging unit 56 both include permanent magnets 70 and there is no selective use of electrical power to secure recharging unit 56 to mounting surface 52. In such modified embodiments, switch 78 or sensor 72 may be omitted, or may still be included for controlling electrical power to the coil 62.

In at least one modified embodiment, controller 74 of patient support apparatus 20 sends instructions to one or more recharging systems 50 instructing them when to supply and/or terminate electrical power to one or more coils 62 and/or one or more electromagnets 70. These instructions may be in lieu of the switching carried out by switch 78 (therefore permitting switch 78 to be omitted, if desired), or they may be in addition to the switching carried out by switch 78. As will be discussed in greater detail below, controller 74 may be programmed to send instructions to one or more recharging systems 50 to supply electrical power to their respective coils 62 (and electromagnets 70, if present) based upon whether or not a person is detected occupying patient support apparatus 20. The presence or absence of such a person may be determined by an exit detection system 82, or by other means, as will now be discussed in greater detail.

Exit detection system 82 of patient support apparatus 20 includes a plurality of force sensors 84. In at least one embodiment, force sensors 84 are load cells, although it will be understood that other types of force sensors may be used besides load cells. In general, exit detection system 82—when armed via a user interface of patient support apparatus 20, such as a user interface 40 (FIG. 1)—determines when an occupant of patient support apparatus 20 has left, or is likely to leave, patient support apparatus 20, and issues an alert and/or notification to appropriate personnel so that proper steps can be taken in response to the occupant's departure (or imminent departure) in a timely fashion. In at least one embodiment, exit detection system 82 monitors the center of gravity of the patient using the system and method disclosed in commonly assigned U.S. Pat. No. 5,276,432 issued to Travis and entitled PATIENT EXIT DETECTION MECHANISM FOR HOSPITAL BED, the complete disclosure of which is incorporated herein by reference. In other embodiments, exit detection system 82 determines if the occupant is about to exit, or already has exited, from patient support apparatus 20 by determining a distribution of the weights detected by each force sensor 84 and comparing the detected weight distribution to one or more thresholds. In such embodiments, the center of gravity may or may not be explicitly calculated.

Other manners for detecting the presence and absence of a patient on support deck 30 may alternatively be implemented. These include, but are not limited to, any of the manners disclosed in the following commonly assigned patent applications: U.S. patent application Ser. No. 14/873,734 filed Oct. 2, 2015, by inventors Marko Kostic et al. and entitled PERSON SUPPORT APPARATUS WITH MOTION MONITORING; U.S. patent publication 2016/0022218 filed Mar. 13, 2014, by inventors Michael Hayes et al. and entitled PATIENT SUPPORT APPARATUS WITH PATIENT INFORMATION SENSORS; and U.S. patent application Ser. No. 15/266,575 filed Sep. 15, 2016, by inventors Anuj Sidhu et al. and entitled PERSON SUPPORT APPARATUSES WITH EXIT DETECTION SYSTEMS, the complete disclosures of all of which are incorporated herein by reference. In some embodiments, the outputs from the force sensors 84 are processed in any of the manners disclosed in commonly assigned U.S. patent application Ser. No. 62/428,834 filed Dec. 1, 2016, by inventors Marko Kostic et al. and entitled PERSON SUPPORT APPARATUSES WITH LOAD CELLS, the complete disclosure of which is incorporated herein by reference. Still other manners of detecting the presence and absence of a patient may be used, including ones that use sensors other than force sensors (such as, but not limited to, image sensors (thermal and visible light), vital sign sensors, pressure sensors, temperature sensors, etc.).

Exit detection system 82 reports whether the presence or absence of a patient is detected on support deck 30 to controller 74. Controller 74, in several embodiments, uses that information to control the power supplied to coils 62 and/or one or more electromagnets 70. In one such embodiment, controller 74 automatically terminates power to coil 62 when a patient's absence is detected from support deck 30 and automatically restores power to coil 62 when the patient's presence is detected on support deck 30. In a modification of this embodiment, controller 74 introduces a predetermined delay between the time the patient's absence is detected and the time it terminates power to coil 62. In both of these embodiments, the termination of power and resumption of power is independent of the armed/disarmed state of exit detection system 82. That is, controller 74 terminates power to the coil(s) 62 when a patient is absent regardless of whether or not exit detection system 82 is armed or disarmed, and controller 74 resumes supplying power to coil(s) 62 when the patient returns, regardless of whether or not exit detection system 82 is armed or not.

In still another modified embodiment, recharging unit 56 is adapted to detect whether or not a device 66 is plugged into any of its ports 64. If so, recharging unit 56 wirelessly sends a signal to primary module 54, which forwards the signal to controller 74. The signal causes controller 74 to override the decision to terminate power to coil(s) 62 based upon outputs from the exit detection system 82. As a result, if a personal electronic device 66 is currently plugged into recharging unit 56, controller 74 continues to supply electrical power to recharging unit 56 and the personal electronic device 66, even when the patient exits patient support apparatus 20.

Figure 2:
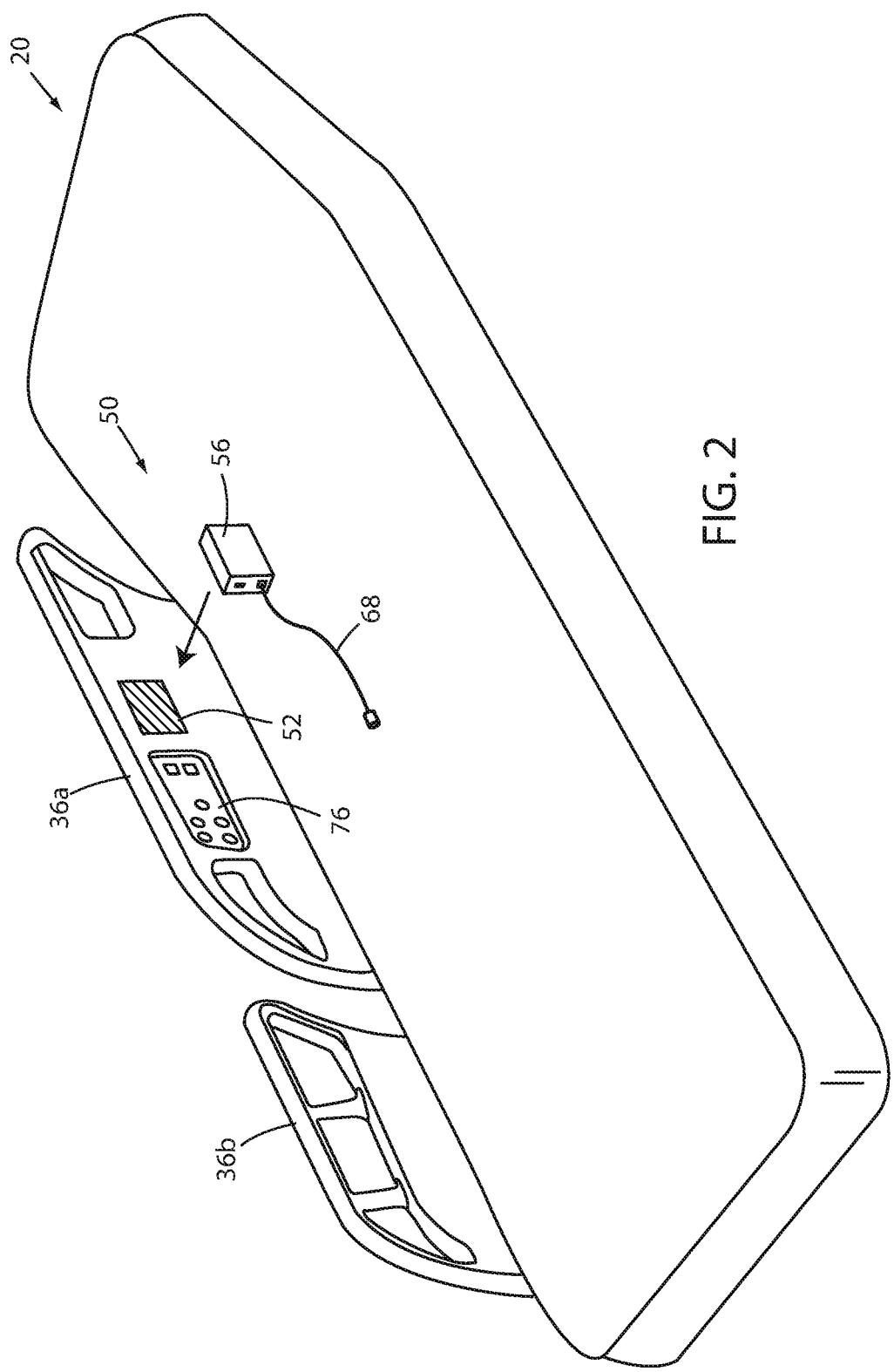
FIG. 2 is a partial perspective view of the patient support apparatus of FIG. 1 illustrating a first embodiment of a recharging system for personal electronic devices.

In the embodiment illustrated in FIGS. 1-2, mounting surface 52 is a generally smooth vertical surface and includes no ports, holes, or other abrupt discontinuities that create difficulties for sanitizing surface 52. That is, mounting surface 52 is a generally flat and easy surface to clean. In some embodiments, mounting surface 52 is merely a designated portion of the siderail surface that extends over the majority of the exterior of the siderail. That is, mounting surface 52 is a not a piece of material separate from the exterior surface of the siderail, but instead is part of that exterior surface. In order for a user to know which area of the exterior surface of the siderail 36 corresponds to the mounting surface 52, mounting surface 52 may include one or more indicia printed, painted, dyed, or otherwise visually marked on siderail 36. The indicia may take on a variety of different forms, but generally are designed to inform the patient and/or healthcare professional that siderail 36 includes recharging capabilities, as well as where to place recharging unit 56 along siderail 36 so as to be both magnetically retained thereagainst and to receive electrical power wirelessly from the coil(s) 62 positioned inside of siderail 36.

A number of modifications to recharging system 50 may be made. These modifications include changes in the location and number of mounting surfaces 52 on patient support apparatus 20, as well as other modifications. For example, although FIG. 1 illustrates a recharging system 50 integrated into a head end siderail 36a, it will be understood that recharging system 50 could alternatively be integrated into a foot end siderail 36b, d, or into a headboard of footboard 34, or into another structure of patient support apparatus 20. Further, although FIG. 4 illustrates two recharging system 50 (one in each head end siderail 36a, c), it will be understood that patient support apparatus 20 can be modified to include only a single recharging system and/or to include more than two recharging systems 50.

Still further, it will be understood that, although recharging system 50 has been referred to and described herein as a system for recharging the batteries of a personal electronic device 66, it is not necessary for system 50 to actually recharge any batteries of the personal electronic device 66. That is, recharging system 50 can be used to supply power to a personal electronic device 66 that includes no batteries, or that already has its batteries recharged. Thus, recharging system 50 functions as a power supply for personal electronic devices 66, regardless of whether the device 66 use the power to recharge its battery or not.

Figure 5:
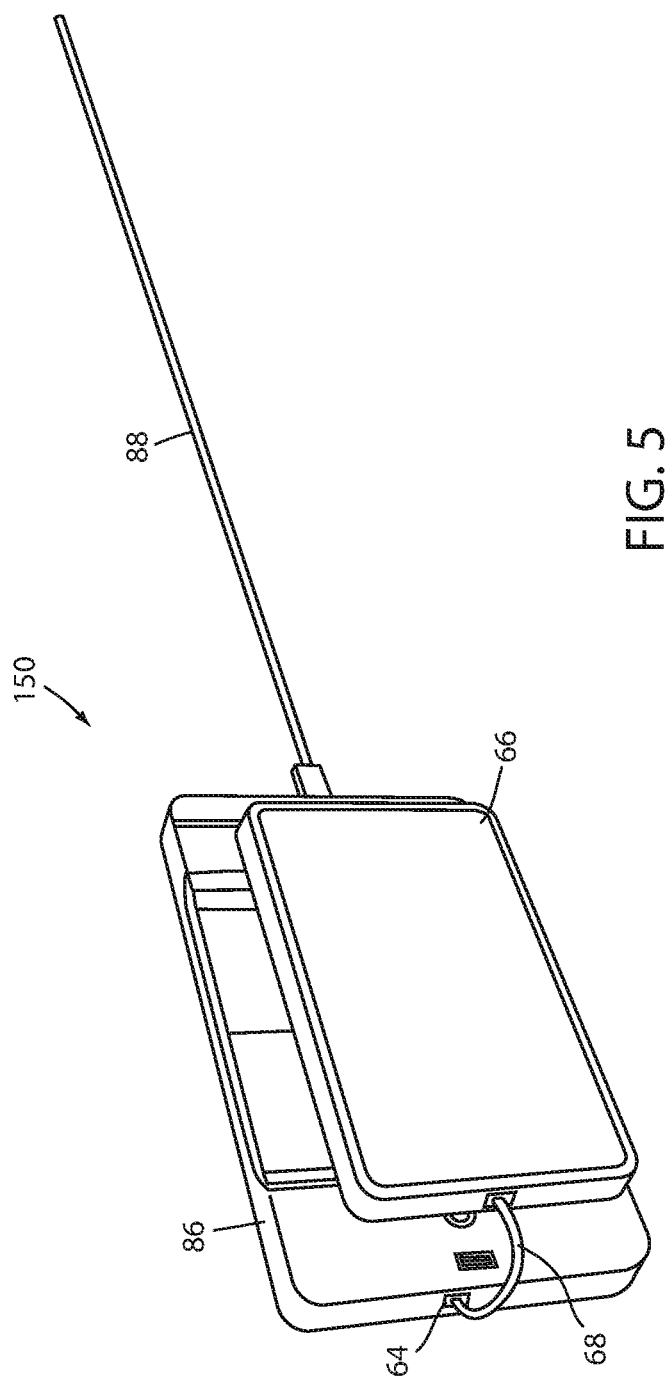
FIG. 5 is a perspective view of a pendant having a recharging system according to a second embodiment of the present disclosure.

FIG. 5 illustrates an alternative recharging system 150. Those components of recharging system 150 that are common to recharging system 50 and that operate in the same or similar manner as described above with respect to system 50 are labeled with the same reference number increased by one hundred. Those components of system 150 that are not found in system 50, or that operate in a significantly different manner, are labeled with a new reference number.

Recharging system 150 includes a pendant 86 coupled by a cord 88 to a port (not shown) of a patient support apparatus, such as, but not limited to, patient support apparatus 20. Pendant 86 is adapted to allow a user to control one or more aspects of the patient support apparatus, such as, but not limited to, one or more of motors 38. Pendant 86 can therefore be used by a patient to change the height and/or orientation of support deck 30, among other functions. In some embodiments, pendant 86 includes a user interface having one or more buttons, switches, dials, or other controls. Pendant 86 may also or alternatively include a touchscreen.

Pendant 86 receives electrical power from the patient support apparatus 20 via cord 88. Pendant 86 also includes a port 164 adapted to receive a cable 168 used for supplying power to a personal electronic device 66. In this manner, pendant 86 can be used both for controlling one or more aspects of its associated patient support apparatus and for supplying power to a personal electronic device 66. Port 164 and cable 168 may be the same as any of the ports 64 and cables 68 described above with respect to recharging system 50.

In at least one embodiment, recharging system 150 also includes one or more magnets/electromagnets 170 (FIG. 4) that are used to magnetically retain the personal electronic device 66 against pendant 86, such as shown in FIG. 5. This magnetic coupling keeps pendant 86 and the personal electronic device 66 together so that a patient can simply flip over the pendant 86 and device 66 combination to whichever device the patient desires to use. In some embodiments, pendant 86 may include one or more sensors 172 to detect the presence of the personal electronic device 66 and to turn on/off power to the electromagnets 170 and/or coils 162 based on the presence/absence of device 66.

In several modified embodiments of recharging system 150, pendant 86 is adapted to wirelessly recharge a personal electronic device 66. In at least one of these modified embodiments, pendant 86 also includes one or more ports 164 for receiving a cable 168 used to optionally provide power to the personal electronic device 66, while in others of these modified embodiments, pendant 86 does not include any ports 164. Regardless of whether any ports 164 are included or not, pendant 86 is adapted to wirelessly supply electrical power directly to the personal electronic device 66 by supplying power to one or more internal coils 162 positioned inside of pendant 86 (FIG. 4). Coils 162 and magnets/electromagnets 170 are adapted to operate in a similar manner to coils 62 and magnets/electromagnets 70 of recharging system 50, except that coils 162 and electromagnets 170 are adapted to deliver power directly to, and couple directly to, personal electronic device 66, rather than to an intermediate device, such as recharging unit 56. When delivering wireless power directly to a personal electronic device 66, the one or more coils 162 of pendant 86 inductively transfer electrical power to one or more coils included within the personal electronic device 66. Thus, a particular personal electronic device 66 must be adapted to receive electrical power wirelessly before it is capable of being wirelessly recharging by recharging system 150.

The components of one embodiment of recharging system 150 are illustrated in FIG. 4. FIG. 4 also illustrates recharging system 50, as described above. FIG. 4 includes both systems 50 and 150 for purposes of both compact illustration, as well as to illustrate that in some embodiments of patient support apparatuses, both charging systems 50 and 150 may be incorporated. In other embodiments, however, patient support apparatus 20 includes only a single type of recharging system 50 or 150, rather than both. Still further, although not illustrated in FIG. 4, control system 80 may be combined with one or more other types of recharging systems, such as any of those described below, either alone or in combination with one or more of systems 50 and/or 150.

Figure 6:
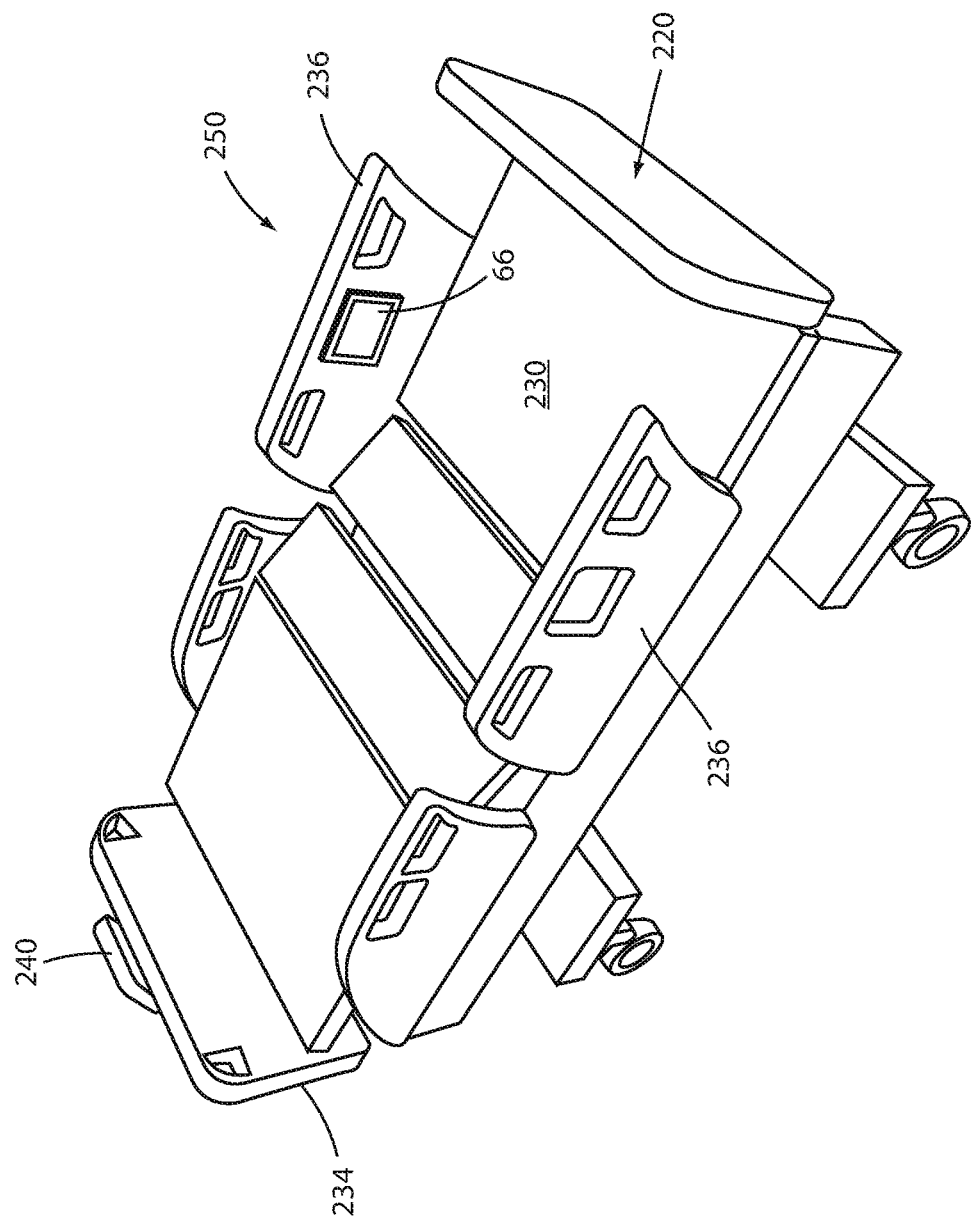
FIG. 6 is a perspective view of a patient support apparatus including a third embodiment of a recharging system according to the present disclosure.
Figure 7:
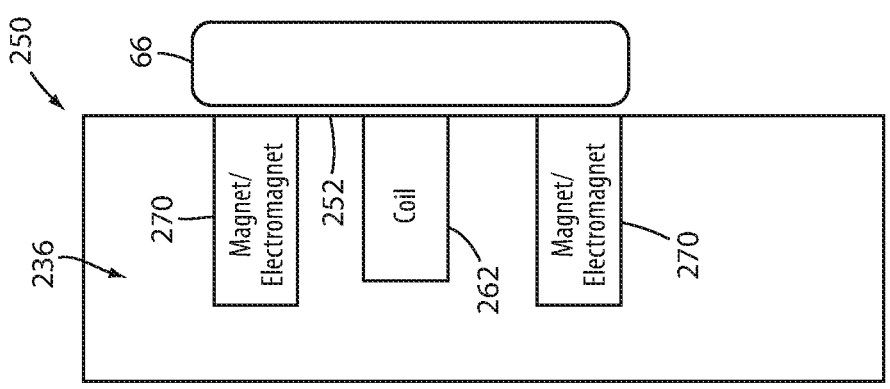
FIG. 7 is a cross-sectional view of the recharging system of FIG. 6 shown with a personal electronic device being recharged.

FIGS. 6 and 7 illustrate another alternative recharging system 250. Those components of recharging system 250 that are common to recharging systems 50 and/or 150 and that operate in the same or similar manner as described above are labeled with the same reference number increased by one hundred. Those components of system 250 that are not found in systems 50 and/or 150, or that operate in a significantly different manner, are labeled with a new reference number.

System 250 is adapted to wirelessly supply electrical power from one or more coils 262 directly to a personal electronic device 66, rather than to an intermediate device, such as recharging unit 56 of recharging system 50. System 250 therefore includes one or more magnets/electromagnets 270 that are adapted to magnetically retain personal electronic device 66 directly against a mounting surface 252. When personal electronic device 66 is retained against mounting surface 252, electrical power is delivered to one or more coils 262 that inductively transfer the electrical power to one or more coils inside of personal electronic device 66.

Personal electronic device 66 is therefore able to be wirelessly recharged while magnetically coupled to a siderail 236 of a patient support apparatus.

Figure 8:
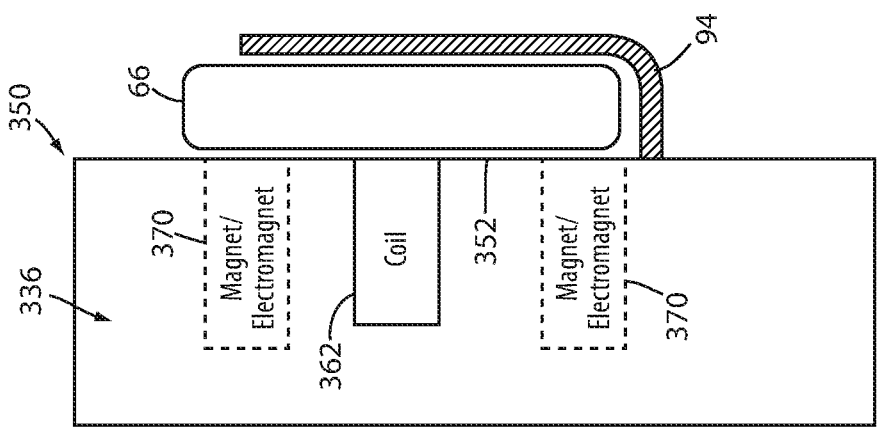
FIG. 8 is a cross-sectional view of a fourth embodiment of a recharging system according to the present disclosure.

FIG. 8 illustrates another alternative recharging system 350. Those components of recharging system 350 that are common to any of the previously described recharging systems and that operate in the same or similar manner as described above are labeled with the same reference number increased by one hundred. Those components of system 350 that are not found in any of the previously described recharging systems, or that operate in a significantly different manner, are labeled with a new reference number.

Recharging system 350 differs from recharging system 250 in that it includes a holder 94. Holder 94 is affixed to mounting surface 352. Holder 94 is adapted to support a personal electronic device 66 while it is being wirelessly recharged by one or more coils 362. Because of the presence of holder 94, magnets/electromagnets 370 may be omitted from system 350. When omitted, personal electronic device 66 is retained generally against mounting surface 352 by holder 94. When included, personal electronic device 66 may be retained against mounting surface 352 by a combination of holder 94 and electromagnets/magnets 370.

Figure 9:
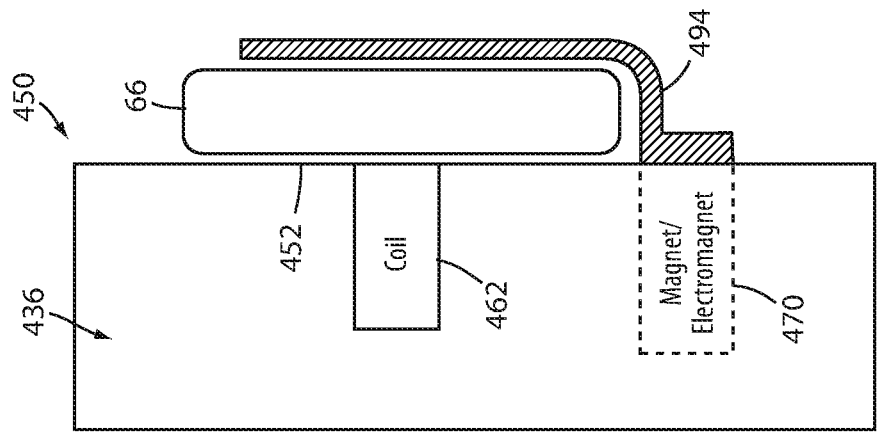
FIG. 9 is a cross-sectional view of a fifth embodiment of a recharging system according to the present disclosure

FIG. 9 illustrates yet another alternative recharging system 450. Those components of recharging system 450 that are common to any of the previously described recharging systems and that operate in the same or similar manner as described above are labeled with the same reference number increased by one hundred. Those components of system 450 that are not found in any of the previously described recharging systems, or that operate in a significantly different manner, are labeled with a new reference number.

Recharging system 450 differs from recharging system 350 in that it includes a holder 494 that is selectively retained against siderail 436 by way of magnetic coupling. That is, one or more magnets/electromagnets 470 positioned inside of siderail 436 are used to magnetically retain holder 494 against siderail 436. Holder 494 can therefore be easily removed from siderail 436 when recharging of a personal electronic device 66 is not needed. The removal of holder 494 leaves exposed the smooth mounting surface 452, thereby enabling it to be easily sanitized. As with recharging system 350, recharging system 450 may include one or more magnets/electromagnets 470 that magnetically couple to personal electronic device 66 and retain device 66 against mounting surface 452, or it may instead rely solely upon holder 494 for retaining device 66 against mounting surface 452.

Although not illustrated in any of FIGS. 6-9, any of recharging systems 250-450 may also include any of the components and functionality of recharging system 50 and/or 150 described above. Thus, for example, any of systems 250-450 may include one or more sensors 72 for detecting the presence of a personal electronic device 66, as well as one or more switches 78 for selectively supplying electrical power to the recharging coils and/or to the electromagnets. Additionally, any one of recharging systems 250-450 may include a controller 74, or be integrated into a control system such as control system 80, that controls when electrical power is supplied to the recharging coils and/or electromagnets. Further, the supply of electrical power to the coils of any of systems 250-450 may be based upon the outputs from an exit detection system, such as exit detection 82, as described above. As yet another modification, any of systems 250-450 may be incorporated into one or more components of a patient support apparatus other than a siderail, such as, but not limited to, a headboard, a pendant (such as pendant 86) or a footboard (such as footboard 34). Still other modifications are possible.

Figure 10:
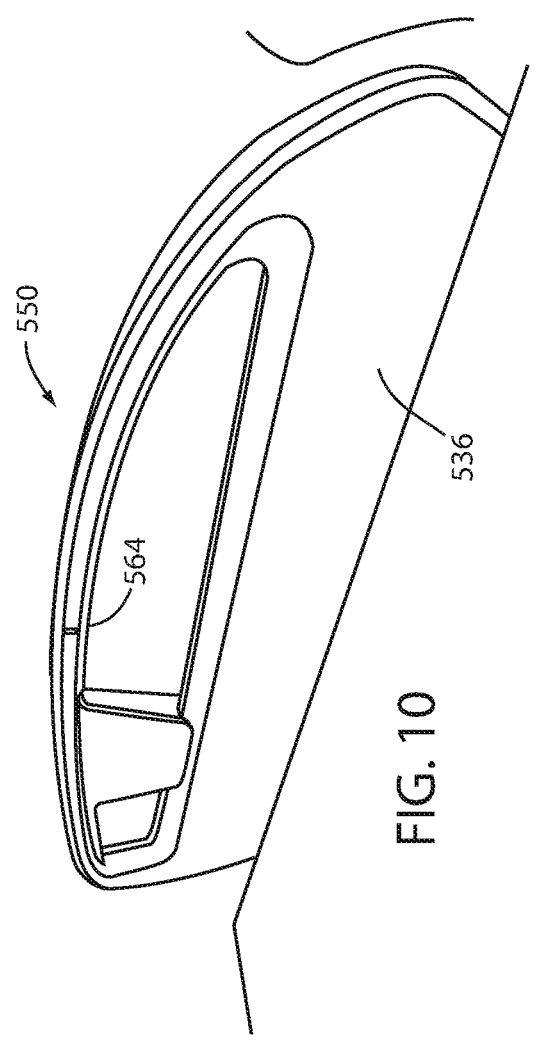
FIG. 10 is a partial perspective view of a siderail of a patient support apparatus implementing a recharging system according to a sixth embodiment of the present disclosure.
Figure 11:
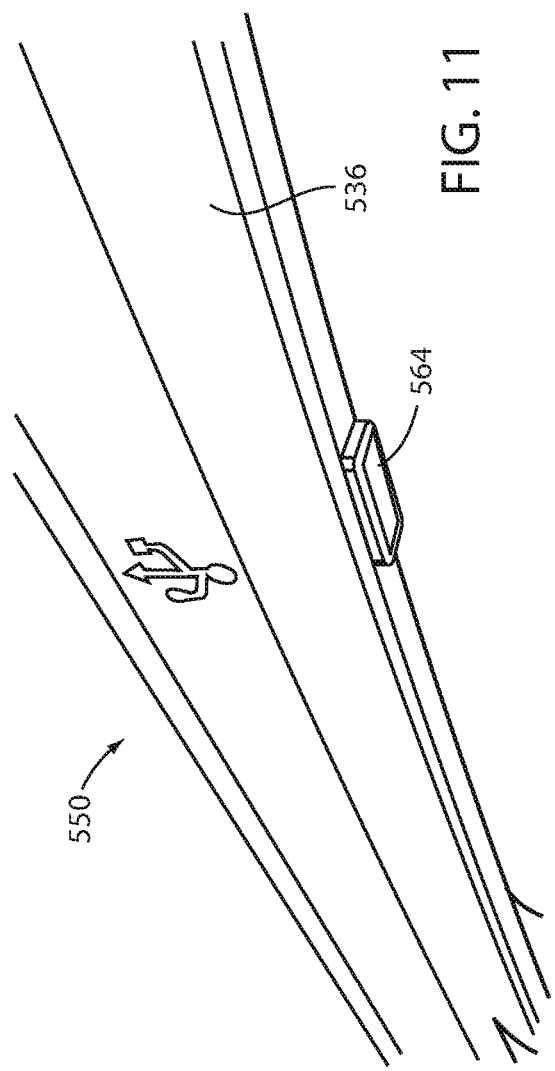
FIG. 11 is a close-up partial perspective view of the siderail of FIG. 10.

FIGS. 10-11 illustrate yet another alternative recharging system 550. Those components of recharging system 550 that are common to any of the previously described recharging systems and that operate in the same or similar manner as described above are labeled with the same reference number increased by one hundred. Those components of system 550 that are not found in any of the previously described recharging systems, or that operate in a significantly different manner, are labeled with a new reference number.

Recharging system 550 includes a port 564 built directly into a siderail 536 of a patient support apparatus. Port 564 may be constructed in any of the manners discussed above with respect to port 64 and is adapted to receive a cable 68 that, at its other end, plugs into a personal electronic device 66. The personal electronic device 66 is therefore powered by directly receiving electrical power from siderail 536 via a cable 68. In some embodiments, siderail 536 is coupled to a controller that controls whether electrical power is supplied to port 564 or not. In some such embodiments, the controller communicates with an exit detection system, such as exit detection system 82, and terminates power to port 564 after a patient has exited from the patient support apparatus and resupplies power to port 564 after the patient returns. In still other embodiments, a sensor and/or sensing circuitry may be in communication with port 564 and adapted to detect when a person inserts a cable into port 564. When a cable is inserted, power is supplied to port 564, and when a cable is not inserted, power is shut off to port 564.

Port 564 is designed to face downwardly from a handle portion of siderail 536. By facing downward, port 564 is less liable to accumulate dirt, fluid, and/or other unwanted material, and is therefore more liable to remain relatively clean. In some embodiments, recharging system 550 includes a pivoting or removable cover that covers port 564 when it is not in use. The cover is designed to hermetically seal off the inside of port 564 from the external environment, thereby preventing unwanted materials from entering port 564 while it is covered.

In any of the recharging system embodiments described herein, the recharging system may additionally include voltage isolation and/or current limiting circuitry that isolates and limits the electricity provided to the ports (64, etc.). In some embodiments, the voltage isolation and current limiting circuitry may utilize a MIC2033 high-accuracy, high-side, fixed current limit power switch available from Micrel, Inc. of San Jose, Calif. Other types of voltage isolation and/or current limiting circuitry may also or alternatively be used.

It will also be understood by those skilled in the art that, although the recharging systems discussed herein have been described as supplying electrical power to one or more personal electronic devices 66, any of these recharging systems can be modified to also communicate data to and/or from the personal electronic devices, in addition to power. In some such embodiments, control system 80 of patient support apparatus 20 includes a network transceiver (wired or wireless) that communicates with a local area network of a healthcare facility and that includes access to the Internet. When a personal electronic device 66 is coupled to a recharging system, the modified control system 80 is adapted to transmit data received from the device 66 to the Internet, thereby allowing the device 66 to use the patient support apparatus 20 as an interface for providing Internet access. Still other forms of data communication between patient support apparatus 20 and the personal electronic device 66 may also or alternatively be implemented.

Various additional alterations and changes beyond those already mentioned herein can be made to the above-described embodiments. This disclosure is presented for illustrative purposes and should not be interpreted as an exhaustive description of all embodiments or to limit the scope of the claims to the specific elements illustrated or described in connection with these embodiments. For example, and without limitation, any individual element(s) of the described embodiments may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Any reference to claim elements in the singular, for example, using the articles "a," "an," "the" or "said," is not to be construed as limiting the element to the singular.

What is claimed is:

1. A patient support apparatus comprising:
   a frame;
   a patient support surface supported on the frame;
   a plurality of force sensors adapted to detect weight applied to the patient support surface;
   a recharger adapted to allow a patient to recharge a personal electronic device; and
   a controller in communication with the force sensors and the recharger, the controller adapted to control power supplied to the recharger based on outputs from the force sensors.

2. The patient support apparatus of claim 1 wherein the recharger includes at least one of the following: (1) a recharging port adapted to receive a plug coupleable to the personal electronic device, and (2) a recharging coil adapted to wirelessly recharge the personal electronic device when the personal electronic device is positioned adjacent the recharging coil.

3. The patient support apparatus of claim 1 wherein the controller terminates power to the recharger after the patient exits from the patient support surface, and the controller resumes supplying power to the recharger when the patient returns to the patient support surface.

4. The patient support apparatus of claim 3 wherein the controller delays terminating power to the recharger for a predetermined time period after the patient exits from the patient support surface.

5. The patient support apparatus of claim 1 wherein the recharger is magnetically coupled to a component of the patient support apparatus, and the recharger wirelessly receives power from a coil attached to the component.

6. The patient support apparatus of claim 1 wherein the recharger is integrated into a pendant having a user interface, the pendant adapted to allow a user to control a plurality of functions of the patient support apparatus.

7. A patient support apparatus comprising:
   a frame;
   a patient support surface supported on the frame;
   a barrier adjacent the patient support surface, the barrier including a coil therein; and
   a recharger adapted to recharge a personal electronic device, the recharger including a magnet for magnetically coupling to the barrier, the recharger adapted to wirelessly receive power from the coil when the recharger is magnetically coupled to the barrier.

8. The patient support apparatus of claim 7 further comprising:
   a sensor coupled to the barrier adapted to detect a presence of the recharger; and
   a control adapted to supply power to the coil when the recharger is magnetically coupled to the barrier and to terminate power to the coil when the recharger is not magnetically coupled to the barrier.

9. The patient support apparatus of claim 7 wherein the recharger includes a port for receiving a cable coupleable to the personal electronic device, the port adapted to supply power to the cable when the cable is plugged into the port.

10. The patient support apparatus of claim 7 further comprising:
    a second coil adapted to wirelessly supply electrical power to the personal electronic device when the personal electronic device is positioned adjacent the recharger; and
    wherein the recharger further comprises a holder for the personal electronic device, the holder adapted to support the personal electronic device sufficiently close to the second coil such that power from the second coil is wirelessly transferred to the personal electronic device.

11. The patient support apparatus of claim 7 further comprising:
    a plurality of force sensors adapted to detect weight applied to the patient support surface, and
    a controller adapted to control electrical power supplied to the coil based upon outputs from the force sensors, wherein the controller terminates power to the coil after a patient exits from the patient support surface and restores power to the coil after the patient returns to the patient support surface.

12. The patient support apparatus of claim 7 further comprising:
    a sensor coupled to the barrier adapted to detect a presence of the recharger;
    a plurality of force sensors adapted to detect weight applied to the patient support surface, and
    a controller adapted to do the following: (1) terminate power to the coil when the recharger is not magnetically coupled to the barrier, regardless of outputs from the force sensors; and (2) terminate power to the coil when a patient exits the patient support surface and the recharger is magnetically coupled to the barrier.

13. The patient support apparatus of claim 12 wherein the controller is further adapted to supply power to the coil when the sensor detects the presence of the recharger and the force sensors indicate a patient is on the patient support surface.

14. The patient support apparatus of claim 7 further comprising an electromagnet integrated into the barrier, the electromagnet adapted to magnetically couple the recharger to the barrier when the electromagnet is powered.

15. A patient support apparatus comprising:
    a frame;
    a patient support surface supported on the frame;
    a barrier adjacent the patient support surface;
    a coil incorporated into the barrier adjacent a surface of the barrier;
    a magnet incorporated into the barrier adjacent the surface of the barrier; and
    a controller adapted to supply power to the coil such that a personal electronic device magnetically supported by the magnet is able to be wirelessly recharged via power delivered from the coil to the personal electronic device.

16. The patient support apparatus of claim 15 wherein the magnet is an electromagnet, the controller controls power supplied to the electromagnet, and the patient support apparatus further comprises a sensor adapted to detect a presence of the personal electronic device adjacent the surface of the barrier, the controller being adapted to terminate power to the coil when the personal electronic device is not present.

17. The patient support apparatus of claim 15 wherein the barrier is a siderail, the surface of the barrier is substantially vertical, and the magnet is adapted to hold the personal electronic device against the surface of the barrier.

18. The patient support apparatus of claim 15 further comprising a holder adapted to support the personal electronic device, the holder including a second magnet adapted to magnetically couple to the magnet of the barrier, whereby the personal electronic device is held adjacent the surface of the barrier by the holder magnetically coupling to the magnet of the barrier.

19. The patient support apparatus of claim 15 further comprising a switch in communication with the controller, the controller adapted to supply power to the coil when the switch is in an on state and to terminate power to the coil when the switch is in an off state.

20. The patient support apparatus of claim 19 wherein the magnet is an electromagnet and the controller controls power supplied to the electromagnet; and wherein the controller is further adapted to supply power to the electromagnet when the switch is in the on state and to terminate power to the electromagnet when the switch is in the off state.

* * * * *